Sept. 17, 1940.  F. S. STERNAD  2,214,825
TIRE BUILDING DRUM
Filed Dec. 17, 1936
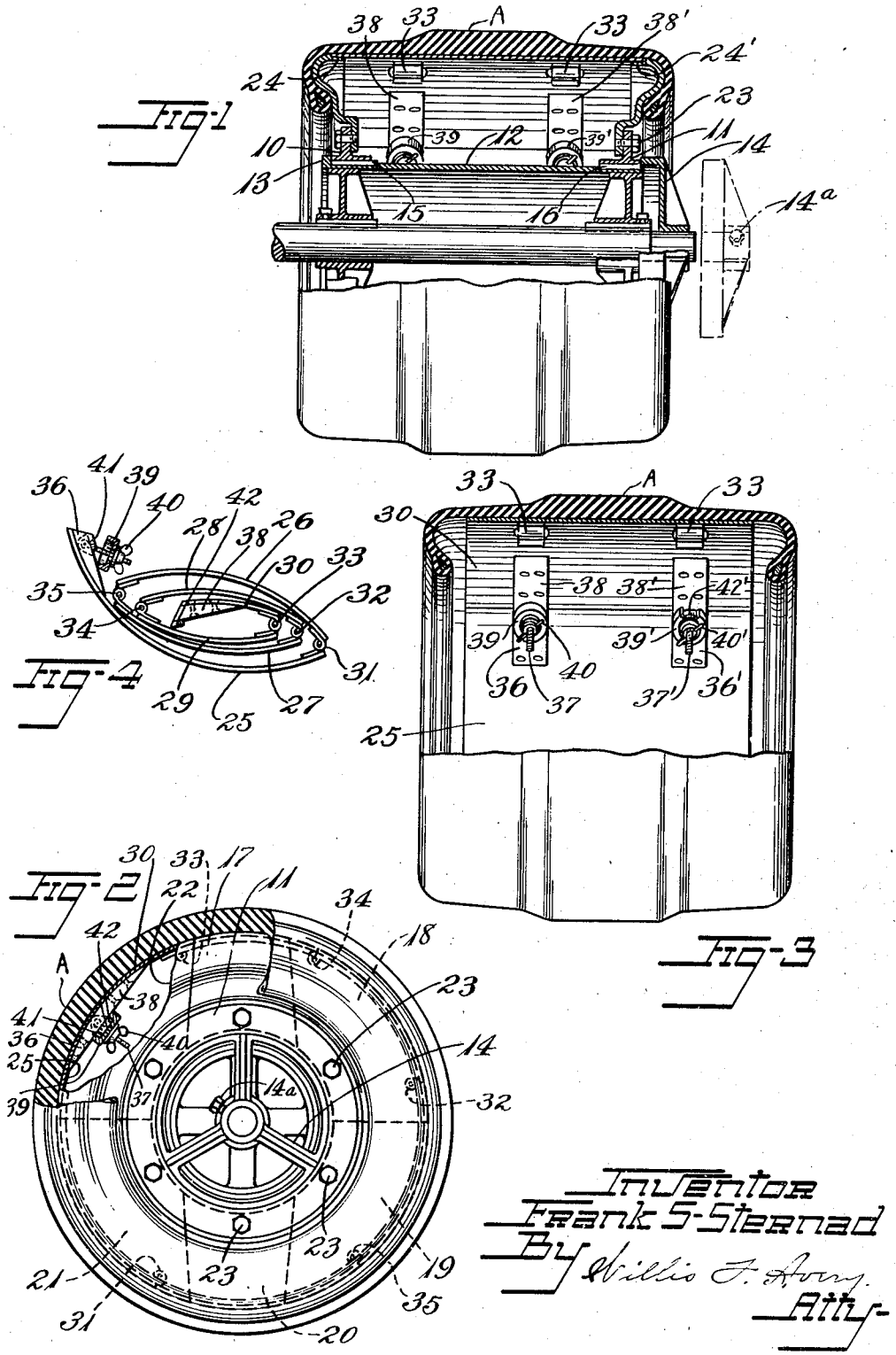

Patented Sept. 17, 1940

2,214,825

UNITED STATES PATENT OFFICE 2,214,825

TIRE BUILDING DRUM

Frank S. Sternad, Cuyahoga Falls, Ohio, assignor to The B. F. Goodrich Company, New York, N. Y., a corporation of New York Application December 17, 1936, Serial No. 116,328

14 Claims. (Cl. 154—9)

This invention relates to tire building drums.

The principal objects of the invention are to provide an improved collapsible drum, to provide simplicity of structure, convenience of operation, facility of removal of the finished tire, and security of assembly.

These and other objects will appear from the following description and the accompanying drawing.

Of the drawing:

Fig. 1 is an elevation, partly broken away, and partly shown in axial section, of a drum constructed according to and embodying the invention in its preferred form.

Fig. 2 is an end elevation, partly broken away and in section, of the same.

Fig. 3 is a side elevation, partly broken away and partly in section, of a tire casing with the collapsible cylindrical shell or stave portion of the drum in place therein, other parts of the drum being removed therefrom.

Fig. 4 is an end view of the shell portion in its collapsed position.

Referring to the drawing, the drum generally comprises a pair of drum heads mounted upon a driving shaft in spaced relation and joined by a collapsible shell or stave section which forms the cylindrical part of the drum and is supported by the drum heads.

The shell or stave section is of low-profile in longitudinal section and may be generally flat, as shown. The drum heads, which support the shell section, form a continuation of the working surface extending radially inward from the shell section a considerable extent, these drum heads being provided with bead-forming portions preferably undercut as is shown in Fig. 1.

The drum is especially suitable for building tires of large cross-section and having relatively small bead diameters, which tires present certain problems in manufacture when built in flattened or low-profile shapes as compared to their full rounded shapes. The provision of bead-forming portions in under-cut fashion on the drum has the advantage of minimizing twisting and distortion of the bead portions of the tire when it is expanded from the flat shape to the rounded shape, but the difficulty of removing a tire-building form from the tire is increased, especially where the bead diameter of the tire is relatively small. The drum of this invention is especially well suited to easy removal from such tires, it being a feature of the invention to support the central shell portion directly upon drum heads, which drum heads are collapsible for removal through the bead openings of the tire in advance of the removal of the collapsible shell.

The drum heads are provided respectively with a pair of base rings 10, 11, which rings are slidably mounted upon a driver 12 between a stop shoulder 13 and a clamp member 14, keys 15, 16 being provided to prevent relative rotation. Ring 11 has mounted thereon a plurality of head sections 17, 18, 19, 20, 21, 22, which are retained by bolts 23. These sections are of such size that they are separately removable from the finished tire A and are therefore shorter in at least one dimension than the diameter of the tire inside its beads. Preferably one or more of the sections are wedge sections, as 17 and 20 to facilitate their being removed in advance of the other sections. Each of the head sections is formed with a shoulder 24 or 24' to center and support the stave sections.

The opposite ring 10 is similarly provided with similar head sections.

The stave section comprises a plurality of sheet metal staves 25, 26, 27, 28, 29, 30 of arcuate form connected by hinges 31, 32, 33, 34 and 35, the arrangement being such that the staves are held in abutting relation when in cylindrical assembly. By making the staves of progressively differing widths they may be folded about their hinged margins into a compact bundle, as illustrated in Fig. 4, which may be passed through the hub opening of the finished tire.

To secure the first and last staves of the articulated shell in alignment, locking means is provided. This may comprise a pair of lugs 36, 36', fixed to stave 25 and lugs 38, 38' fixed to stave 30, a cupped collar 39, 39' on each bolt 37, 37', a wing nut 40, 40' on each bolt to force the collar toward the lugs, and mating dowel projections 41, 41', and 42, 42' on lugs 36, 36', and 38, 38' adapted to be held together by the cupped margin of the collars 39, 39'. Lugs 36, 36' and 38, 38' are formed with angularly disposed meeting faces to permit the stave 30 to be swung inwardly in collapsing the stave section of the drum.

In assembling the drum, the drum heads are each assembled and the stave section is then assembled as a cylinder and is placed between the drum heads, resting upon the shoulders 24, 24', thereof. This is accomplished by moving the one drum head toward the other. The clamp member 14 is fastened to the spindle by means of a set screw 14a, to hold the drum parts in assembled relation.

After the tire A has been built upon the assembled drum, the bolts 23 are removed. Then the key sections 11, 20 are withdrawn. Then the other parts of the drum heads are removed. The wing nuts 40, 40' are then loosened and the stave section is collapsed and folded as in Fig. 4 and then removed from the tire.

To provide a surface adapted to the forming of a tire with its bead portions in the position they assume in the expanded tire casing, the drum heads are preferably formed of such radial cross-section as to provide a convex portion and radially inward thereof a convex bead seating portion, the drum being narrower at the bead seating portion than outwardly thereof.

I claim:

1. A tire-building drum for use in building tires of small rim diameter, said drum comprising a pair of drum heads and a barrel section therebetween, each drum head comprising a base ring and a plurality of segments removably attached thereto and defining an undercut working surface removable from the tire in advance of the barrel section by independent disassembly, and the barrel section comprising a plurality of staves hinged to each other in succession to permit rolling of the section into small compass, the end staves of the hinged series having means for detachably securing them to each other when the section is in barrel form, said barrel section being supported solely by said drum heads in the assembled drum.

2. A tire building drum comprising a pair of axially spaced apart collapsible drum heads, each head comprising a plurality of head sections and means disposed radially inward thereof upon which the sections are mounted for supporting them, and a stave portion bridging the space between and supported solely by said drum heads.

3. A collapsible tire-building drum for building tires having bead diameters relatively small as compared to the maximum tire diameter, said drum comprising axially spaced apart drum head structures having bead-forming portions in the end faces thereof, a central shell structure disposed radially outward of said bead-forming portion a considerable extent and supported solely by said drum head structure, said structures each being collapsible and separately removable from the tire and constructed and arranged for collapse and removal of said drum head structures through a bead opening of the tire in advance of the removal of said shell structure.

4. A collapsible tire building drum for building tires having bead diameters relatively small as compared to the maximum tire diameter, said drum comprising sectional axially spaced apart drum head structures having bead-forming portions in the end faces thereof, a central shell structure disposed radially outward of said bead forming portions a considerable extent and supported solely by said drum head structures, said structures each being collapsible and separately removable from the tire and constructed and arranged for collapse and removal of said drum head structures piece by piece through the bead opening of the tire in advance of the removal of said shell structure.

5. A collapsible tire-building drum having bead-forming portions at the end faces thereof radially inward a material extent from the outer drum circumference, said drum comprising a collapsible intermediate shell portion, and a pair of axially spaced apart collapsible drum heads providing the sole support for said shell portion and provided with the bead-forming portions, and constructed and arranged to be removed from the tire through the bead opening thereof in advance of removal of said shell portion.

6. A collapsible tire-building drum comprising a collapsible shell portion constructed and arranged to provide a forming surface of low profile in cross section, and collapsible supporting means therefor constructed and arranged to provide a bead-forming portion extending radially inward a material extent in continuation of said forming surface, said supporting means constituting the entire support of said shell portion and being removable from a tire casing constructed thereover through the bead opening of the casing in advance of removal of said shell portion.

7. A collapsible tire-building drum comprising a collapsible stave portion constructed and arranged to provide a forming surface of low profile in cross section, and collapsible supporting means therefor constructed and arranged to provide a bead-forming portion extending radially inward a material extent in continuation of said forming surface, said supporting means constituting the entire support of said stave portion and being removable from a tire casing constructed thereon through the bead opening of the casing in advance of said stave portion.

8. A tire-building drum comprising a pair of drum heads, and a collapsible structure supported directly upon said drum heads, said drum heads being collapsible and removable from a tire in advance of removal of said collapsible structure without distortion of the tire, said structure comprising a plurality of staves hinged to each other in series and separable between two of the staves to permit rolling of the structure on itself, said drum heads and said collapsible structure each having a surface comprising a zone of a contoured work-supporting surface for engaging the inner surface of the tire between its beads.

9. A tire-building drum comprising a pair of drum heads, and a collapsible structure supported directly upon said drum heads, said drum heads each comprising a set of assembled sections removable piece by piece from a tire in advance of removal of said collapsible structure without distortion of the tire, said structure comprising a plurality of staves hinged to each other in series and separable between two of the staves to permit rolling of the structure on itself, said drum heads and said collapsible structure each having a surface comprising a zone of a contoured work-supporting surface for engaging the inner surface of the tire between its beads.

10. A tire-building drum comprising a pair of drum heads, and a collapsible structure supported directly upon said drum heads, said drum heads each comprising a base ring of smaller diameter than the bead portions of the tire, and a plurality of head sections detachably mounted thereon and separately removable therefrom without substantial distortion of the tire, said structure comprising a plurality of staves hinged to each other in series and separable between two of the staves to permit rolling of the structure on itself, said drum heads and said collapsible structure each having a surface comprising a zone of a contoured work-supporting surface for engaging the inner surface of the tire between its beads.

11. A collapsible tire-building drum for building tires having bead diameters relatively small as compared to the maximum tire diameter, said drum comprising a collapsible shell portion of low profile in section and a pair of drum heads for supporting the same, said shell portion comprising a plurality of staves hinged to each other in series and separable between two of the staves to permit rolling of the structure on itself, and said drum heads having bead forming portions on the end faces thereof in continuation of the forming surface of the shell and undercut with respect thereto, and comprising a plurality of sections detachably mounted on a base ring and removable through the bead opening of a tire casing formed on the drum in advance of removal of the shell section and comprising the sole supporting means for said shell section.

12. A collapsible tire-building drum for building tires, said drum comprising a collapsible segmental drum body, and an independently collapsible segmental bead-seating flange structure comprising the sole support for said body, said flange structure being removably mounted at an end of said body and comprising flange segments detachable therefrom by removing them radially inward from the said body.

13. A tire-building drum for building tires, said drum comprising a collapsible segmental substantially cylindrical drum body, and a pair of independently collapsible undercut bead-seating rings comprising the sole support for said body and removably mounted in the ends of said body to provide the end portions of the outer periphery of the drum, said rings comprising segments inwardly collapsible for removal from the drum body.

14. A tire-building drum for building tires, said drum comprising a radially collapsible segmental drum body, and a bead-seating ring for supporting said body, said bead-seating ring being mounted in an end thereof for supporting said body solely from its ends and comprising separable segments, each being detachable from the drum body by an inward radial movement.

FRANK S. STERNAD.